(No Model.)
W. M. BROWN.
ELECTRIC RAILWAY.
No. 599,828. Patented Mar. 1, 1898.
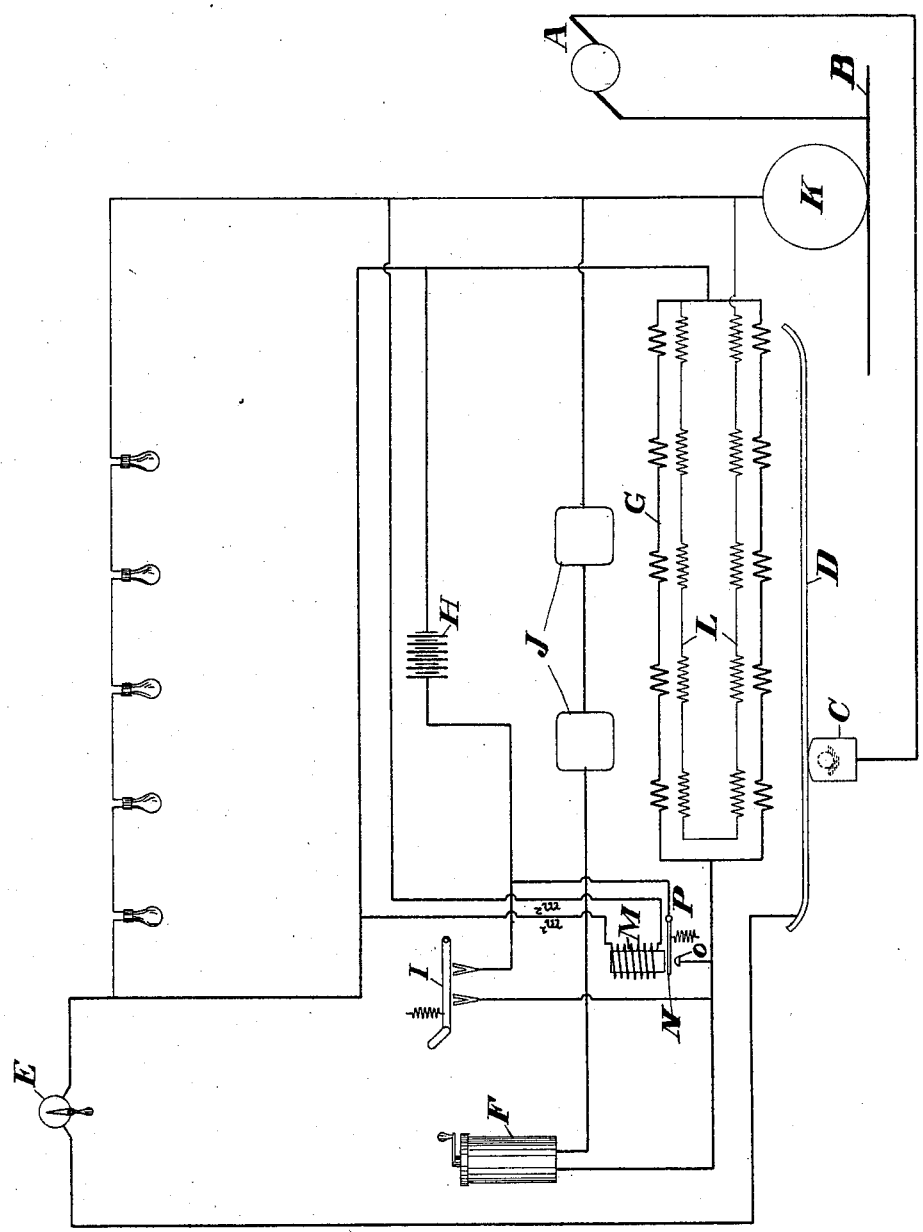
WITNESSES:
Myrtle E. Sharpe.
Fred A. Phelps Jr.
INVENTOR
W. Milt. Brown
BY
Richard Eyre
ATTORNEY.

UNITED STATES PATENT OFFICE.

WILLIAM MILTON BROWN, OF JOHNSTOWN, PENNSYLVANIA, ASSIGNOR TO THE JOHNSON COMPANY, OF LORAIN, OHIO.

ELECTRIC RAILWAY.

SPECIFICATION forming part of Letters Patent No. 599,828, dated March 1, 1898.

Application filed October 7, 1897. Serial No. 654,362. (No model.)

*To all whom it may concern:*

Be it known that I, WILLIAM MILTON BROWN, of Johnstown, in the county of Cambria and State of Pennsylvania, have invented a new and useful Improvement in Electric Railways, of which the following is a full, clear, and exact description, reference being had to the accompanying drawings, which form a part of this specification.

My invention relates to that class of railways in which a bared conductor in disconnected sections forms one side of the working circuit, in which normally open current-conveyers are provided between the source of supply and the said conductor-sections and in which a traveling magnet is provided to temporarily close the said current-conveyers.

In a former application of mine, which was filed May 11, 1897, and was given the Serial No. 635,984, I show an improved winding for the traveling magnet composed of a low-resistance winding and a high-resistance winding, the former being in series with the car-motors, while the latter is a shunt about the car-motors. I also show in the aforesaid application a set of batteries carried by the car and so connected to the circuits that they may be used to pass current through the low-resistance magnet-winding when the main circuit is opened. I also show means whereby these batteries may be charged without delay in the operation of the car and without the addition of any special apparatus for the purpose.

The use of the simultaneously-operated series and shunt windings of the magnet allows the magnet to be strongly energized even when a heavy current pull of the motors tends to reduce the voltage across the shunt-winding, for the reduction in the strength of the shunt-winding to a large extent is compensated for by the larger amount of current passing through the series winding. This, however, is only true within certain limits, and of course the strength of the magnet must decidedly decrease if the voltage falls to too low a figure.

The object of my present invention is to provide for this contingency by supplying a normally open switch between the batteries and the magnet-coils, which automatically closes when the voltage drops below a predetermined figure—say, for example, three hundred volts—and thus enables the battery to still further energize the magnet by passing additional current through the low-resistance winding.

The drawing which accompanies this specification represents a diagrammatic view of those parts of the car-wiring which have any bearing upon the present invention.

A represents the dynamo at the power-station, one terminal of which is connected to the rails B of the track, while the other terminal is connected by intermediate feeders and subfeeders, which are not here shown, to the switching mechanism within the contact-box C. This switching mechanism, as before explained, is ordinarily open, so that no current is delivered to the top of the box, but it is closed by the field of a magnet carried beneath the traveling vehicle.

At D, I show a collecting-shoe which makes contact with box C only when the aforesaid magnet is above the box. The current from the collecting-shoe D passes to the canopy-switch E, so that when the canopy-switch is opened no current is delivered to any of the circuits upon the vehicle. From E connection is next made in multiple to the controller F through a series winding G for energizing the switch-closing magnet. The other connection from E to F is through the batteries H, which connection is normally kept open by means of the switch I. From the controller F the current passes through the motors J J and their resistances, shunts, &c., which are not here shown, to the ground side of the circuit, which is represented by the car-wheel K.

L represents a shunt-winding for the coils of the magnetic closer.

The passage of the current when the car is traveling under normal conditions would be as follows: from the dynamo A to the contact-box C, through the switching mechanism, which would be closed by the presence of the magnetic closer, to the collecting-shoe D, to the canopy-switch E. Thence part would be shunted through the coils L to energize magnet and part would pass through the low-resistance coils G, still further energizing the magnet, the latter part then going through the controller F and the motors J J, returning to the power-house by means of the wheel K and the rail B.

If the car is at rest and there is a high enough resistance in the circuit between the power-house and the part of the line upon which the car is standing to cause a heavy drop in voltage when the car is started, the shunt-coils L may not energize the magnet sufficiently; but the increased amount of current which passes through the motors and causes the said drop in voltage also passes through the coils G and increases their energizing power, so that they will compensate for the loss of power in the coils L.

If the car is at rest and the canopy-switch E is opened, so that no further current is in either the coils G or L, the switching mechanism within the boxes C would of course be open, and no current could therefore be received by the car. In this event the motor-man closes the switch I, which is preferably a foot-switch placed near the operator's position, and a circuit is made through the coils G, with the battery H as the source of power. This will energize the magnet sufficiently to close the switching mechanism, and as soon as this is done the switch I may again be opened, the coils L being sufficient to keep the switching mechanism closed.

When the batteries need charging, it is only required that the motorman close the switch I while he is passing current through the controller and motors. In this case the current received by the motors will pass in multiple from E to F through the coils G and the battery H, the latter part of the current serving to charge the batteries.

At M, I show a magnet having a winding which is connected at one side by the wire $m'$ to the high-potential side of the circuit, while at the other side it is connected by the wire $m^2$ to the ground side of the circuits. N represents an armature, and P a spring which tends to draw the armature against the contact-point O. The strength of this magnet M is so adjusted that when the voltage between $m'$ and $m^2$ is above a predetermined figure—say three hundred volts—the armature N will be attracted in opposition to the pull of the spring P, and there is therefore an open circuit between N and O. When, however, the voltage falls below this predetermined figure, the spring P will draw the armature N against the contact O and current will flow from the batteries through the coils G of the magnet. Under these conditions it will be seen that there are three coöperating agencies for energizing the magnet, a current passing through the shunt-coils L, current passing through the series coils G from the main line, and current passing through the same coils from the battery.

The use of a switch between the batteries and the winding G which automatically closes when the line-voltage falls below a predetermined figure would be equally advantageous whether the coils through which the battery-current passes are in series with the motors or not. I do not, therefore, limit myself to such a combination.

Those portions of my invention which are herein shown and described, but which are not claimed, form the subject-matter of the hereinbefore-mentioned prior application.

I have shown my invention entirely in diagram and do not limit myself to any mechanical construction of the parts thereof. Further, I have shown my invention as applied to a vehicle apparently intended for normal travel in but one direction. It is evident, however, that it will be mere duplication to so arrange the parts that the car could be operated from either end, as is usually done to-day. It is also clear that I need not limit myself to the exact details shown and described, for the scope of my invention is broader than the specific arrangement by which the invention has been illustrated and can therefore be readily modified by any one skilled in the art.

Having thus described my invention, what I claim, and desire to protect by Letters Patent, is—

1. The combination with the traveling magnet, energizing-coils therefor connected to opposite sides of the main circuit, and a second set of energizing-coils therefor, of an independent source of current-supply and a switch interposed in a circuit between the independent source of supply and the said second set of energizing-coils and arranged to close whenever the voltage of the main circuit falls below a predetermined figure.

2. The combination with a traveling-magnet closer and energizing-coils therefor comprising a shunt-winding and a second winding in series with the motors, of an independent source of current-supply and a normally open switch between the said independent source of supply and the said second winding arranged to close at a predetermined drop in the voltage of the main circuit.

3. The combination of the shunt-winding of the traveling magnet connected to the main circuit, a comparatively low resistance winding, an independent source of current-supply, and means for passing current simultaneously through the shunt-winding from the main circuit and through the low-resistance winding from the independent source of supply, said means being governed by a predetermined drop in the voltage of the main circuit.

4. The combination of the shunt-winding L, the series winding G, the batteries H, and the automatically-closing switch between the batteries and the said series winding.

5. A traveling magnetic closer having a compound winding comprising a winding receiving a shunt-current from the main circuit, and a second winding receiving a current from the main circuit only when the current is passing to the motors, in combination with an independent source of current-supply and means for passing current therefrom through said second winding when the main-circuit voltage falls abnormally.

In testimony whereof I have affixed my signature in presence of two witnesses.

WILLIAM MILTON BROWN.

Witnesses:
  RICHARD EYRE,
  MYRTLE E. SHARPE.